3,245,874
CYANINE DYES AS AN AGRICULTURAL
BACTERICIDE
Yuzo Seto, Kaiichiro Sakazume, and Hiroyoshi Yamaguchi, Tokyo, Japan, assignors to Konishiroku Photo Ind. Co., Ltd., Tokyo, Japan
No Drawing. Filed Feb. 18, 1963, Ser. No. 259,365
Claims priority, application Japan, Feb. 21, 1962, 37/6,740
11 Claims. (Cl. 167—33)

The present invention relates to agricultural disinfectant or microbicide compositions chiefly containing cyanine dye compounds. The invention has for its object to provide novel microbicide and fungicide compositions of excellent antimicrobial activity against a variety of blights and microorganisms harmful to plant life. More particularly, the invention pertains to such chemical compositions having a high antimicrobic activity as peculiar to cyanine type dyes.

Heretofore, there have been used Bordeaux mixture, organo-mercuric compounds and the like for destroying the injurious bacteria which cause various plant diseases. Their antimicrobic effects are not sufficient, and furthermore, such disinfectants often present deleterious effects, when applied for example by spraying, upon fruits and leaves of living plants due to the toxic salts of heavy metals contained in large proportions in the compositions. The spraying of such mercuric compounds is in fact prohibited by law in some countries from a standpoint of public hygiene.

Among a variety of bacterial plant diseases is *Xanthomonas oryzae* (bacterial leaf blight) which most harasses the rice crop industry of this country with wide-spread damage. However, no chemical agents definitely acceptable for use in the elimination of *Xanthomonas oryzae* have yet been found, except Bordeaux mixture, cuprous-mercury and antibiotics such as streptomycin that show some effect only for the early stage of generation of that bacterium but often leave physiological injuries with the plant.

Since the use of these disinfectants results in decreased yield of the rice crop, their application is nowadays limited to instances where a seriously extensive propagation of crop bacteria is anticipated.

In an effort to find new effective materials for antimicrobial purposes, the present inventors have conducted extensive research and experiments on numerous compounds. It has now been found that cyanine dyes have excellent antimicrobic power and can substantially meet the requirements of an agricultural bactericide. These dye compounds exhibit powerful antimicrobic effect upon *Xanthormonas oryzae*, *Xanthomonas citri* (canker), *Bacterium tobacum* (wild-fire), *Xanthomonas pruni* (bacterial shot-hole), etc. And, they present a peculiar antimicrobial spectrum. Quite different from antibiotics, the cyanine type bactericide of the invention is a substantially stable compound and is free of toxicity upon humans and animals. The ideal character as a microbicide of the chemical compositions of the invention may be represented by the general formula

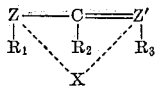

where Z and Z' denote a nitrogen-containing heterocyclic nucleus and its derivatives, respectively. Typical examples of such derivatives are pyridine, quinoline, thiazoline, thiazole, benzothiazole, naphthothiazole, oxazoline, oxazole, benzoxazole, napthoxazole, indolenine, benzimidazole, pyrroline, pyrrole, selenazoline, selenazole, benzoselenazole, pyrazole, thiadiazole, oxadiazole, pyrimidine, triazole, tetrazole and their derivatives, etc. Z and Z' may be the same or different, as the case may be. $R_1$ and $R_3$ designate an alkyl, alkenyl, aryl or aralkyl group and a derivative thereof, respectively, the two being the same or different, as the case may be. $R_2$ is a hydrogen or alkyl group. X is an organic or inorganic acid radical.

Representative forms of the cyanine dyes obtainable from the above general formula are:

(1) 3-ethyl-1'-methylseleno-2'-cyanineiodide

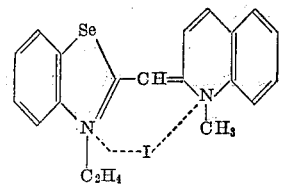

(2) 1-methyl-1'-ethyl-2,4'-cyanineiodide

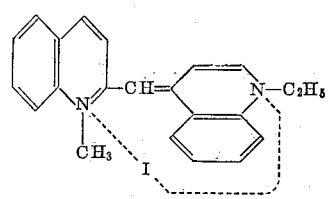

(3) 3,3'-diallyloxacyanine-bromide

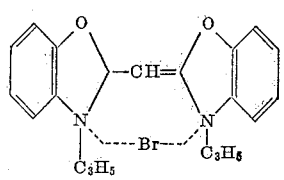

(4) 1' - ethyl - 3,4 - dimethylthiazolo - 2'-cyanine-p-toluenesulphonate

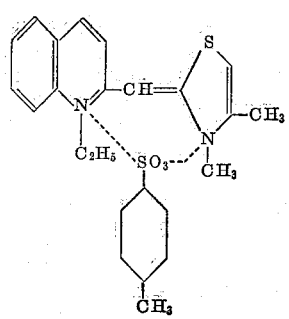

(5) 3-ethyl-1'-methyloxa-2'-cyanine iodide

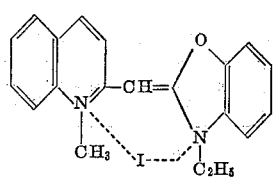

(6) 3-ethyl-1'-methylthiazoline-2'-cyanineiodide

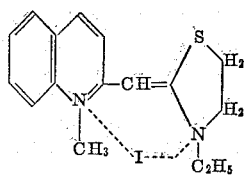

(7) 1-ethyl-1'-methyl-2,2'-cyanineiodide

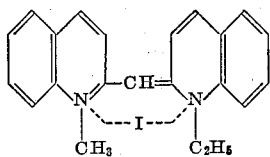

(8) 1-methyl-1'-benzylpyrolino-4'-cyanineperchlorate

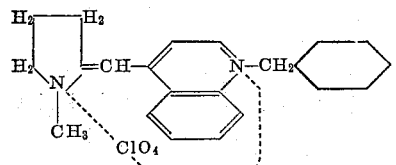

(9) 3,3',4,4'-tetramethylthiazolocyanineiodide

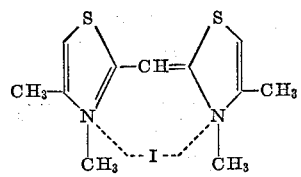

(10) 1',3,8-trimethylthia-2'-cyanineiodide

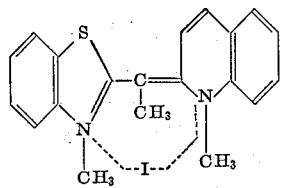

Other cyanine dye examples according to the invention include 1,3'-diethyl-5,5'-dimethyl-pyrolinooxacyanineperchlorate, 1,3,3'-trimethyl-1'-beta-carboxyethylindo-2'-cyanineiodide, 3-methyl-3'-beta-chlorethyl-5'-phenylthiazolinothiacyaninebromide, 3-carboxyaminomethyl-1'-ethylthia-2'-cyanineiodide, 3,2',4' - trimethylthia-1',3',4'-thiadiazolocyanineperchlorate, 3,2',4'-trimethylthia-1',3',4'-oxadiazolocyanineiodide and 1,3'-dimethyl-3,4-diphenylthia-1,2,4-triazolocyanine perchlorate.

Many other cyanic compounds embodying the invention may be cited as will be apparent to those skilled in the art.

Now, an explanation of the effectiveness and antimicrobial activity of these dyes of the invention as applied to various plantpathogenic bacteria will be afforded by experimental results as follows.

1. DETERMINATION OF MINIMUM GROWTH INHIBITORY CONCENTRATION FOR SOME PLANTPATHOGENIC BACTERIA

This was done by an agar dilution streak method to determine the minimum effective concentration of each of the cyanine dye samples necessary to inhibit the growth of plant bacteria. The results are tabulated below.

Table 1

[Unit: p.p.m.]

| | Xanthomonas oryzae | Xanthomonas citri | Bacterium tabacum | Xanthomonas pruni |
|---|---|---|---|---|
| Sample No. 2 | 10 | 100 | 10 | 100 |
| Sample No. 4 | 1 | 100 | 10 | 100 |
| Sample No. 9 | 1 | 100 | 10 | 100 |
| Streptomycin | 10 | 100 | 100 | 10 |

It has been found that the cyanine dyes of the invention exhibit a bactericidal effect comparable to streptomycin used as an agricultural antibiotic.

Also, a test tube dilution method using a liquid bouillon medium as an assay medium was employed for the same purpose, with the results given in Table 2.

Table 2

[Unit: p.p.m.]

| | Sample No. 4 | Sample No. 6 | Sample No. 7 | Sample No. 8 |
|---|---|---|---|---|
| Piricularia oryzae | 25-5 | 25-5 | 25 | 25 |
| Cochliobolus miyabeanus | 5 | 5 | 5 | 5 |
| Alternaria kikuchiana | 5 | 5 | 25 | 25-5 |
| Colletorichum legenarium | 25 | 25 | 25-5 | 2 |
| Xanthomonas oryzae | 25 | 5 | 25 | 125 |

2. ANTIMICROBIAL ACTIVITY TEST ON *XANTHOMONAS ORYZAE* BY PAPER DISK METHOD

Five ml. of sterilized water was introduced into a test tube slant culture containing *Xanthomonas oryzae* and sufficiently stirred by a platinum wire-loop, thereby preparing a bacterium suspension. The total amount of which was admixed with 200 ml. of an assay agar medium.

Fifteen ml. of 1.5% raw agar was placed on a Petri dish of 9 cm. diameter and disposed to solidification. Over the basal agar layer thereby formed was poured 5 ml. of assay agar medium containing the above bacterium to form an upper layer upon soldification. The assay medium used is composed of the following components:

| | | |
|---|---|---|
| Glutamic acid soda | grams | 2.0 |
| Potassium hydrogen phosphate | do | 2.0 |
| Magnesium chloride | do | 1.0 |
| Ferrous sulfate | do | 0.1 |
| Sucrose | do | 20.0 |
| Yeast extract | do | 2.0 |
| Peptone | do | 5.0 |
| Agar | do | 15–20 |
| Distilled water | ml | 1000 |

A paper disc of about 7 mm. diameter was subjected to immersion in 1,000 p.p.m. of acetone solution containing a dye sample of the invention for a period of about 30 minutes. This was then placed on the Petri dish on which the above assay agar medium had previously been solidified. After culturing at 27° C. for about 24 hours, the inhibition zone surrounding the paper disc was measured for antimicrobial activity of the dye sample. The same testing procedure was employed for several different samples. The results were compared as illustrated in Table 3.

*Table 3*

| | |
|---|---|
| Sample 1 | 28.0 |
| Sample 2 | 24.4 |
| Sample 4 | 32.4 |
| Sample 6 | 38.9 |
| Sample 8 | 35.2 |
| Streptomycin | 24.9 |

It will be understood that some of the samples of the invention listed above far excel streptomycin in antimicrobial activity when applied in the same concentration (1,000 p.p.m.).

3. GREENHOUSE TEST.

This was performed by spraying a sample dye of the invention over rice seedlings grown in the pots in a greenhouse. The disease tested is bacterial leaf blight of rice plant, caused by *Xanthomonas oryzae*. The rice seedlings used were 4–5 leaves stages. After the sprayed dye dried on rice leaves, a water suspension of *Xanthomonas oryzae* was sprayed. The rice seedlings thus inoculated with the bacterium were disposed seedlings for about 24 hours in a moist chamber (25° C., more than 95% relative humidity). It was thereafter placed on water filled vat covered with vinyl tent in the greenhouse and so disposed for about 24 days. Subsequently, the test mass was removed from the greenhouse and examined for the rice leaf spots on the upper two leaves of the seedlings and calculated the index of disease spots per pot according to the following equation by the Yoshimura method. The results are shown in Table 4 below.

*Table 4*

| Sample | Concentration of sample (p.p.m.) | Index of disease spots per pot | | Total index |
|---|---|---|---|---|
| | | 4th leaf | 5th leaf | |
| Sample No. 6 | 50 | 24.2 | 1.8 | 26.0 |
| Do | 100 | 11.4 | 0.4 | 11.8 |
| Sample No. 7 | 100 | 16.3 | 1.3 | 17.6 |
| Streptomycin | 200 | 10.0 | 4.4 | 14.4 |
| Do | 400 | 3.6 | 2.9 | 6.5 |
| Non-treat | | 56.3 | 15.6 | 71.9 |

|  | Percent |
|---|---|
| 0 | 0 |
| I | 1-5 |
| II | 10 |
| III | 15-25 |
| IV | 30-40 |
| V | >50 |

NOTE.—I-V denote areas of diseased spots per area of total leaves.

$$\text{Index of disease spots (percent)} = \frac{0.5\text{I} + \text{II} + 2\text{III} + 3\text{IV} + 5\text{V}}{5 \times \text{Total leaves examined}} \times 100.$$

As will be apparent from the above table, the cyanine dye compositions of the invention when applied in 100 p.p.m. correspond in microbe inhibiting effect to the streptomycin used in 200 p.p.m. which is a critical concentration thereof (any higher concentrations would cause pronounced adverse effects of the chemical on the rice plant). The compositions of the invention have been found perfectly harmless to the living vegetation during the above experiments.

Now, in actual application, it is to be understood that the cyanine dye fungicide compositions of the invention are suitably admixed with a carrier. Any compounds which do not destroy or decay cyanine dyes may be used as said carrier either in liquid or solid form as the occasion calls for. Successful solid carriers are talc, clay, kaolin, silica, bentonite, diatomaceous earth and the like. As liquid carriers, there may be used water, acetone, methanol, ethylene glycol, cyclohexanol and their mixtures. The effect of the invented bactericides can be further enhanced by adding in suitable proportions assisting agents such as an emulsifier, swelling agent, dispersant or adhesive. These are, for example, anionic, cationic or nonionic surface active agents, polyvinyl alcohol and synthetic latex which give excellent results.

It has been ascertained that the compositions of the invention are highly stable and can be advantageously co-used with other types of agricultural chemicals such as parathion, dipterex, DDT and other insecticides or fungicides such as organic mercuric compounds, blasticidins, Bordeau mixture and the like. Furthermore, fertilizers such as ammonium sulfate and urea can be successfully blended with the cyanine compositions of the invention without degrading the antimicrobial action.

Some of the typical examples of the present invention will now be accounted for in order that the nature and principles of the invention may be better understood, but they are cited only for purposes of illustration and will in no way restrict the scope of the invention.

EXAMPLE I

To 5 parts of the cyanine dye sample No. 4 were added 90 parts of kaolin and 5 parts of alkylarylsulfonate. The mixture was diluted with water to 500–1,000 times the original strength. The bactericide thus prepared was applied in 15 liters per acre of paddy field. The bactericide was applied by sprayer every other week over the period of late July to mid August. The rice leaves were sampled each in the latter part of August and the early part of September and checked for the growth of bacteria, particularly for *Xanthomonas oryzae*. The results are given in Table 5, from which it is evident that the bactericide of the invention can exhibit an antimicrobial effect comparable to that of streptomycin which is generally regarded as a specific for *Xanthomonas oryzae*. It may be added that the chemical of the invention has no phytogenic effect on the rice plant.

*Table 5*

| | Index of disease spots (by Yoshimura method) | |
|---|---|---|
| | Late August | Mid September |
| Control | 10.6 | 21.3 |
| Streptomycin, 400 p.p.m. | 4.9 | 10.9 |
| Invented bactericide | 1.6 | 11.4 |

EXAMPLE II

To 2 parts of the cyanine dye sample No. 6 were added 44 parts of acetone, 44 parts of methanol, 6 parts of polyethylene glycol alkylester and 4 parts of alkylarylsulfonate. The mixture, after each component was sufficiently dissolved, was diluted with water to 200–400 times the original strength. This is a typical example of the bactericide compositions prepared in emulsion form in accordance with the invention.

EXAMPLE III

To 1 part of the cyanine dye sample No. 7 of the invention were added 98.5 parts of dry clay and 0.5 part of calcium stearate. The mass was mixed and applied by dusting. This is one way of preparing the cyanine dye compositions in powdery form according to the invention.

Having described the nature and principles of the invention in the foregoing, it is to be understood that many changes and modifications may be made as will be obvious to those skilled in the art without departing from the scope of the invention, for which we now claim:

1. The method which comprises subjecting vegetation subject to attack by a blight-causing organism to the action of a cyanine dye compound of the formula:

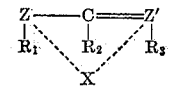

wherein Z is a nitrogen-containing heterocyclic radical linked to the substituents $R_1$ and X by the nitrogen atom of the heterocyclic radicals, wherein Z' is a nitrogen-containing heterocyclic radical linked to the substituents $R_3$ and X by the nitrogen atom of the heterocyclic radical, wherein $R_1$ is selected from the group consisting of lower alkyl, benzyl and phenyl, wherein $R_2$ is selected from the group consisting of hydrogen and lower alkyl, wherein $R_3$ is selected from the group consisting of lower alkyl, benzyl and phenyl, and wherein X is an acid anion, in an amount effective against said blight-causing organism.

2. The method which comprises subjecting vegetation subject to attack by a blight-causing organism to the action of a cyanine dye compound of the formula:

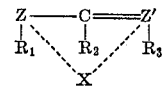

wherein Z is a nitrogen-containing heterocyclic radical linked to the substituents $R_1$ and X by the nitrogen atom of the heterocyclic radicals, wherein Z' is a nitrogen-containing heterocyclic radical linked to the substituents $R_3$ and X by the nitrogen atom of the heterocyclic radical, wherein $R_1$ is lower alkyl, wherein $R_2$ is lower alkyl, wherein $R_3$ is lower alkyl, and wherein X is an acid anion, in an amount effective against said blight-causing organism.

3. The method which comprises subjecting vegetation subject to attack by a blight-causing organism to the action of a cyanine dye compound of the formula:

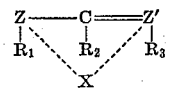

wherein Z is a nitrogen-containing heterocyclic radical linked to the substituents R₁ and X by the nitrogen atom of the heterocyclic radicals, wherein Z' is a notrogen-containing heterocyclic radical linked to the substituents R₃ and X by the nitrogen atom of the heterocyclic radical, wherein R₁ is lower alkyl, wherein R₂ is lower alkyl, wherein R₃ is lower alkyl, and wherein X is an acid anion selected from the group consisting of perchlorate, sulphonic acid radical and halogen, in an amount effective against said blight-causing organism.

4. Method according to claim 1 in which said cyanine dye is 1'-ethyl-3,4-dimethylthiazole-2'-cyanine p-toluenesulphonate.

5. Method according to claim 1 in which said cyanine dye is 3-ethyl-1'-methylthiazolino-2'-cyanine iodide.

6. Method according to claim 1 in which the cyanine dye is 1-ethyl-1'methyl-2,2'-cyanine iodide.

7. Method according to claim 1 in which the cyanine dye is 1-methyl-1'-benzylpyrolino-4'-cyanine perchlorate.

8. Method according to claim 1 in which the cyanine dye is 3,3'4,4'-tetramethylthiazolocyanine iodide.

9. Composition for attacking blight-causing organisms, comprising a cyanine dye compound of the formula:

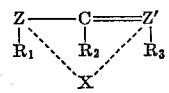

wherein Z is a nitrogen-containing heterocyclic radical linked to the substituents R₁ and X by the nitrogen atom of the heterocyclic radicals, wherein Z' is a nitrogen-containing heterocyclic radical linked to the substituents R₃ and X by the nitrogen atom of the heterocyclic radical, wherein R₁ is selected from the group consisting of lower alkyl, benzyl and phenyl, wherein R₂ is selected from the group consisting of hydrogen and lower alkyl, wherein R₃ is selected from the group consisting of lower alkyl, benzyl and phenyl, and wherein X is an acid anion, in an amount effective against said blight-causing organism, a solid particulate carrier, and a swelling agent compatible with said cyanine dye compound.

10. The method which comprises subjecting vegetation subject to attack by a blight-causing organism to the action of a cyanine dye compound of the formula:

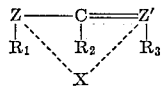

wherein Z is a nitrogen-containing heterocyclic radical linked to the substituents R₁ and X by the nitrogen atom of the heterocyclic radicals, wherein Z' is a nitrogen-containing heterocyclic radical linked to the substituents R₃ and X by the nitrogen atom of the heterocyclic radical, wherein R₁ is selected from the group consisting of methyl, ethyl, propyl, benzyl and phenyl, wherein R₂ is selected from the group consisting of hydrogen and methyl, wherein R₃ is selected from the group consisting of methyl, ethyl, propyl, benzyl and phenyl, and wherein X is p-toluene-sulphonic acid anion, in an amount effective against said blight-causing organism.

11. The method which comprises subjecting vegetation subject to attack by a blight-causing organism to the action of a cyanine dye compound selected from the group consisting of 3-ethyl-1'-methylseleno-2'-cyanine-iodide, 1-methyl-1'-ethyl-2,4'-cyanineiodide, 3,3'-diallyl-oxacyanine-bromide, 1'-ethyl - 3,4 - dimethylthiazolo-2'-cyanine-p-toluenesulphonate, 3 - ethyl-1' - methyloxa-2'-cyanine iodide, 3-ethyl-1' - methylthiazoline-2'-cyanine-iodide, 1-ethyl-1'-methyl-2,2'-cyanineiodide, 1 - methyl-1'-benzylpyrolino-4'-cyanineperchlorate, 3,3',4,4' - tetra-methylthiazolocyanineiodide, 1',3,8-trimethylthia-2'-cyanineiodide, 1,3'-diethyl-5,5'-dimethyl-pyrolinooxacyanine-perchlorate, 1,3,3' - trimethyl - 1'-beta-carboxyethylindo-2'-cyanineiodide, 3-methyl-3'-beta-chlorethyl - 5'-phenyl-thiazolinothiacyaninebromide, 3-carboxyaminomethyl-1'-ethylthia - 2'-cyanineiodide, 3,2',4'-trimethylthia-1',3',4'-thiadiazolocyanineperchlorate, 3,2',4' - trimethylthia-1,3', 4'-oxadiazolocyaninediodide and 1,3' - dimethyl - 3,4-diphenylthia - 1,2,4 - triazolocyanine perchlorate, in an amount effective against said blight-causing organism.

References Cited by the Examiner
UNITED STATES PATENTS

| | | | |
|---|---|---|---|
| 2,316,268 | 4/1943 | Dessau | 260—240.7 |
| 2,708,669 | 5/1955 | Clicky et al. | 260—240.7 |
| 2,980,671 | 4/1961 | Nys et al. | 260—240.7 |

JULIAN S. LEVITT, *Primary Examiner.*

LEWIS GOTTS, *Examiner.*